Patented Dec. 30, 1930

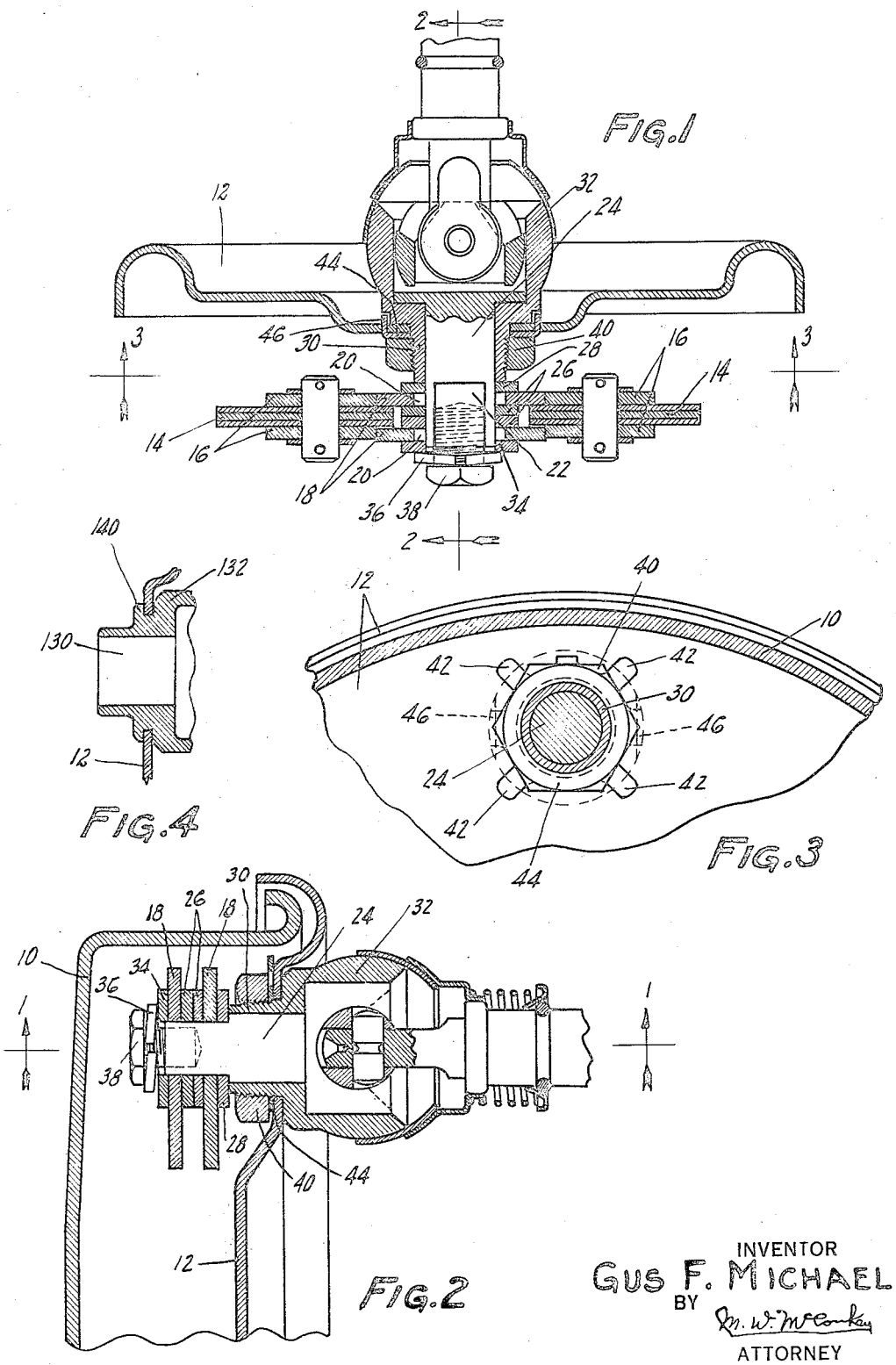

1,786,670

UNITED STATES PATENT OFFICE

GUS F. MICHAEL, OF SOUTH BEND, INDIANA, ASSIGNOR TO BENDIX BRAKE COMPANY, OF SOUTH BEND, INDIANA, A CORPORATION OF ILLINOIS

BRAKE CONTROL

Application filed November 30, 1927. Serial No. 236,633.

This invention relates to brakes, and is illustrated as embodied in a novel control or operating device for the brake.

One feature of the invention relates to facilitating the mounting of the control on a support such as a brake backing plate. Preferably there is a bearing bracket having a shoulder seated against one face of the backing plate, a portion of the bracket which is formed with the shaft bearing projecting through the backing plate and being provided with a part, such as a nut, seated against the other face of the plate and cooperating with the shoulder to secure the bracket to the plate.

Another feature of novelty relates to flattening the shaft to be received in a transverse slot formed in a cam or other brake-applying device, and to the means for securing the cam against movement axially of the shaft. Preferably the shiftable brake-applying device is gripped frictionally between spacers mounted on the shaft, to prevent it from shifting except under load, novel means being provided to hold the spacers.

The above and other objects and features of the invention, including various novel and desirable details of construction, will be apparent from the following description of the structure illustrated in the accompanying drawing, in which:

Figure 1 is a horizontal section through the upper part of a brake assembly (without the drum), substantially on the line 1—1 of Figure 2;

Figure 2 is a section vertically through the novel control, on the line 2—2 of Figure 1;

Figure 3 is a section transversely through the control, on the line 3—3 of Figure 1; and Figure 4 is a sectional view, corresponding to part of Figure 2, but showing a modified construction.

The illustrated brake includes the usual rotatable drum 10, at the open side of which is a stationary support such as a backing plate 12, and within which is arranged the friction means of the brake. In the illustrated brake the friction means includes pivoted shoes, the webs of which are partially shown in section at 14 in Figure 1. These webs are shown provided with pairs of thrust rollers 16 for engagement with the brake-applying means.

The novel brake-applying means illustrated in the drawing includes devices, such as cams 18 engaging the rollers 16 and guidingly embracing the ends of the webs 14 between them, and which are formed with transverse slots 20 slidably embracing a flattened portion 22 of the cam-shaft 24. Where two devices 18 are provided, spacers 26 may be sleeved on the shaft between them, the spacers 26 being in this case substantially equal in thickness to the webs 14.

A spacer 28 is also sleeved on shaft 24 behind the cams 18 or their equivalents, in engagement with the end of a bearing portion 30 of a novel support or bracket 32, in which the shaft 24 is journaled. Another spacer 34 is sleeved on the end of the shaft, being held in place axially of the shaft by novel means such as a spring washer 36 seated in a groove adjacent the end of the shaft, and which groove may be formed by the shaft end together with the head of a part 38 inserted in the end of the shaft.

Preferably the part 38 is adjustable, for example being threaded into the end of the shaft, so that it may be tightened up against the spring member 36 to cause spacers 34 and 28 frictionally to grip the brake-applying devices 18, in such a manner as to resist their movement crosswise of the shaft and prevent them from shifting except under load.

Bracket 32, or its equivalent, is preferably formed with a shoulder engaging the outer side of the backing plate 12, and co-operating with a part, such as a nut 40 threaded on the bearing portion 30, in securing the bracket to the backing plate. The nut may be locked by bending against its sides one or more tongues 42 of a washer 44 under the nut. Washer 44 may also have tongues 46 interlocking with openings in the backing plate.

In the arrangement of Figure 4, the bearing portion 130 of bracket 132 is provided with a flange 140 displaced or riveted over against the inner face of the backing plate 12.

While various details of construction have been particularly described, it is not my intention to limit the scope of the invention by that description, or otherwise than by the terms of the appended claims.

I claim:

1. A brake control comprising, in combination, a brake backing plate, a bearing bracket having a shoulder engaging one face of the backing plate and having a portion extending through the backing plate and which is provided with a part engaging the opposite face of the plate and co-operating with said shoulder in securing the bracket to the plate, said bracket being formed with a shaft bearing extending through said portion, and a washer on said portion and which is formed and arranged to interlock with the backing plate.

2. A brake control comprising, in combination, a brake backing plate, a bearing bracket having a shoulder engaging one face of the backing plate and having a portion extending through the backing plate and threaded which is provided with a nut threaded on said portion against the opposite face of the plate and co-operating with said shoulder in securing the bracket to the plate, said bracket being formed with a shaft bearing extending through said portion, and a washer on said portion under the nut and which is formed and arranged to interlock with the backing plate and with the nut.

3. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft and one of which is seated against the end of the support, and a part on the end of the shaft holding the other spacer and confining said device and the spacers against movement axially of the shaft.

4. A brake control comprising, in combination, a support formed with a shaft bearing, a shaft in said bearing having a flattened portion projecting beyond the support, a pair of brake-applying devices formed with transverse slots seated on the flattened portion of the shaft, spacers between and on opposite sides of said devices and which are mounted on the shaft and one of which is seated against the end of the support, and a part on the end of the shaft holding the other end spacer and confining said devices and the spacers against movement axially of the shaft.

5. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft and one of which is seated against the end of the support, the shaft having an external groove adjacent its end, and a part seated in said groove and holding the other spacer.

6. A brake control comprising, in combination, a support formed with a shaft bearing, a shaft in said bearing having a flattened portion projecting beyond the support, a pair of brake-applying devices formed with transverse slots seated on the flattened portion of the shaft, spacers between and on opposite sides of said devices and which are mounted on the shaft and one of which is seated against the end of the support, the shaft having an external groove adjacent its end, and a part seated in said groove and holding the other end spacer.

7. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft and one of which is seated against the end of the support, the shaft having an external groove adjacent its end, and a part seated in said groove and holding the other spacer, the shaft having a headed separately formed part inserted in its end and with the shaft end forming said groove.

8. A brake control comprising, in combination, a support formed with a shaft bearing, a shaft in said bearing having a flattened portion projecting beyond the support, a pair of brake-applying devices formed with transverse slots seated on the flattened portion of the shaft, spacers between and on opposite sides of said devices and which are mounted on the shaft and one of which is seated against the end of the support, the shaft having an external groove adjacent its end, and a part seated in said groove and holding the other end spacer, the shaft having a headed separately-formed part inserted in its end and with the shaft end forming said groove.

9. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft and one of which is seated against the end of the support, the shaft having an external groove adjacent its end, and a part seated in said groove and holding the other spacer, the shaft having a headed separately-formed part threaded in its end and with the shaft end forming said groove.

10. A brake control comprising, in combination, a support formed with a shaft bearing, a shaft in said bearing having a flattened portion projecting beyond the support, a pair of brake-applying devices formed with transverse slots seated on the flattened portion of the shaft, spacers between and on opposite sides of said devices and which are mounted on the shaft and one of which is seated against the end of the support, the shaft having an external groove adjacent its end, and a part seated in said groove and holding the other end spacer, the shaft having a headed separately-formed part threaded in its end and with the shaft end forming said groove.

11. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft, and means for urging the spacers together frictionally to grip the brake-applying device and resist its movement crosswise of the shaft.

12. A brake control comprising, in combination, a support formed with a shaft bearing, a shaft in said bearing having a flattened portion projecting beyond the support, a pair of brake-applying devices formed with transverse slots seated on the flattened portion of the shaft, spacers between and on opposite sides of said devices and which are mounted on the shaft, and means for urging the outer spacers together frictionally to grip the brake applying devices and resist their movement crosswise of the shaft.

13. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft, and means for urging the spacers together frictionally to grip the brake-applying device and resist the movement crosswise of the shaft, said means comprising a part adjustably inserted in the end of the shaft and holding the end spacer against movement axially of the shaft.

14. A brake control comprising, in combination, a support formed with a shaft bearing, a shaft in said bearing having a flattened portion projecting beyond the support, a pair of brake-applying devices formed with transverse slots seated on the flattened portion of the shaft, spacers between and on opposite sides of said devices and which are mounted on the shaft, and means for urging the outer spacers together frictionally to grip the brake-applying devices and resist their movement crosswise of the shaft, said means comprising a part adjustably inserted in the end of the shaft and holding the end spacer against movement axially of the shaft.

15. A brake control comprising, in combination, a support formed with a shaft bearing, a shaft in said bearing having a flattened portion projecting beyond the support, a brake-applying device formed with a transverse slot seated on the flattened portion of the shaft, spacers on opposite sides of said device and which are mounted on the shaft, and means for urging the spacers together frictionally to grip the brake-applying device and resist the movement crosswise of the shaft, said means comprising a part adjustably inserted in the end of the shaft and cooperating with the shaft end to define a groove, and a spring member seated in said groove and urging the spacers and the brake-applying device axially of the shaft toward the support.

In testimony whereof, I have hereunto signed my name.

GUS F. MICHAEL.